United States Patent
Leizerovich et al.

[11] Patent Number: 6,122,488
[45] Date of Patent: Sep. 19, 2000

[54] METHOD AND APPARATUS FOR INCREASING AN OUTPUT IMPEDANCE OF A TRANSMIT AMPLIFIER DURING RECEIVE MODE OF A TWO-WAY COMMUNICATION UNIT

[75] Inventors: Gustavo D. Leizerovich, Miami Lakes; Dennis G. Anson, Coral Springs, both of Fla.

[73] Assignee: Motorola, Inc., Schaumburg, Ill.

[21] Appl. No.: 09/035,660

[22] Filed: Mar. 5, 1998

[51] Int. Cl.$^7$ ......................................... H01Q 1/36
[52] U.S. Cl. ........................... 455/78; 455/82; 455/83; 455/127; 455/574; 455/343; 455/38.3; 330/251; 330/256
[58] Field of Search .................. 455/78, 82, 83, 455/127, 574, 343, 38.3; 330/251, 286, 256

[56] References Cited

U.S. PATENT DOCUMENTS

| | | | |
|---|---|---|---|
| 5,237,288 | 8/1993 | Cleveland | 330/107 |
| 5,323,127 | 6/1994 | Komazaki et al. | 333/126 |
| 5,669,068 | 9/1997 | Kielmeyer et al. | 455/83 |
| 5,812,936 | 9/1998 | DeMont | 455/63 |
| 5,896,113 | 4/1999 | O'Neill, Jr. | 343/895 |

*Primary Examiner*—Nay Maung
*Assistant Examiner*—Temica M. Davis
*Attorney, Agent, or Firm*—Daniel C. Crilly; Steven A. May; Jeffrey R. Jacobs

[57] ABSTRACT

A communication unit (200) employs a method and apparatus for increasing an output impedance of a transmit amplifier during a receive mode of the communication unit. The communication unit includes a transmit amplifier, an antenna (209), and a signal receiver (211), and is operable in at least a transmit mode and a receive mode. During the transmit mode, the transmit amplifier, which includes an amplifying device (201), amplifies an input signal (221) and provides the amplified signal (233) to the antenna for transmission. During the receive mode, the antenna receives signals and provides the received signals to the signal receiver. To mitigate the transmit amplifier's effect on the received signals during the receive mode, the communication unit, during the receive mode, couples the transmit amplifier to the antenna and applies a bias (225) to the amplifying device to increase the output impedance ($Z_{out}$) of the transmit amplifier, such that the transmit amplifier does not significantly load the received signals.

13 Claims, 3 Drawing Sheets

METHOD AND APPARATUS FOR INCREASING AN OUTPUT IMPEDANCE OF A TRANSMIT AMPLIFIER DURING RECEIVE MODE OF A TWO-WAY COMMUNICATION UNIT

FIELD OF THE INVENTION

The present invention relates generally to two-way communication units and, in particular, to enabling a half-duplex or time division duplex communication unit to operate without an antenna switch.

BACKGROUND OF THE INVENTION

Wireless communication units are known. Such units comprise, among other things, two-way radios and radiotelephones, and typically include a transmitter, a receiver, and an antenna. The transmitter typically includes an information signal source and a transmit amplifier.

Wireless communication units are known to provide full duplex and half duplex operation. A communication unit that provides full duplex operation permits the communication unit to transmit (typically on a transmit frequency) and receive (typically on a receive frequency that is different than the transmit frequency) at the same time. A communication unit that provides half duplex operation requires the communication unit to transmit and receive at different times. Thus, with a half duplex communication unit, the user must stop transmitting in order to receive a communication; whereas, with a full duplex communication unit, the user can receive and transmit at the same time. In time division multiple access systems, the communication units may provide time division duplex operation that, like full duplex operation, allows the user to receive a communication without having to stop talking, but like half duplex operation, requires the actual transmission and reception of information to occur during different time periods known as time slots.

In a typical half-duplex or time division duplex communication unit, the receiver and the transmitter are intermittently coupled to the antenna via an antenna switch. The transmit amplifier and receiver portions of such a typical time division duplex communication unit 100 are depicted in block diagram form in FIG. 1. The transmit amplifier portion of the communication unit 100 includes an amplifying device 101, a direct current (DC) power supply 103 (e.g., a battery), a supply voltage controller 105, a bias controller 107, and an antenna switch 109. The receiver portion of the communication unit 100 includes a transmission line 115 having an electrical length of one-quarter wavelength of a transmit frequency of the communication unit 100, a PIN diode 119 coupled between the transmission line 115 and a signal common 121, a DC blocking capacitor 117, and a signal receiver 113.

During transmission (e.g., during a transmit time slot), an input signal 123 (e.g., modulated voice or data) is applied to the amplifying device 101, which amplifies the input signal 123 based on an applied supply voltage 125 and an applied bias voltage 127 (e.g., when the amplifying device 101 is a field effect transistor (FET)) or current (e.g., when the amplifying device 101 is a bipolar junction transistor (BJT)). The supply voltage 125 and the bias voltage 127 are provided in accordance with known techniques by applying a supply control signal 133 to the supply controller 105 and a bias control signal 131 to the bias controller 107, respectively. In addition to the supply and bias control signals, an antenna switch control signal 135 is applied to the antenna switch 109 to couple the output of the transmit amplifier's amplifying device 125 to an antenna 111 to facilitate radio transmission of the amplified signal. To prevent the amplified signal from entering (and possibly destroying) the signal receiver 113, a receive enable/disable control signal ($V_c$) 129 is applied to the PIN diode 119 causing the PIN diode 119 to conduct current and effectively short-circuit the signal receiver end of the one-quarter wavelength transmission line 115 through the PIN diode 119. By short-circuiting the transmission line 115, the transmission line 115 effectively presents an open circuit impedance to the output of the transmit amplifier, thereby allowing substantially all of the amplified signal to be provided to the antenna 111.

During reception (e.g., during a receive time slot), the receive enable/disable control signal ($V_c$) 129, the supply voltage 125, and the bias voltage 127 are all removed and the antenna switch control signal 135 is adjusted to cause the antenna switch 109 to open the path between the transmit amplifier and the antenna 111, thereby allowing the signal received by the antenna 111 to proceed to the signal receiver 113 via the DC blocking capacitor 117. Without the antenna switch 109 present, the output impedance of the transmit amplifier (typically 100 ohms for a gallium arsenide FET amplifying device with no supply voltage or bias voltage applied) would load the received signal, thereby reducing the magnitude of the received signal that is applied to the signal receiver 113 and, in effect, undesirably reducing the receive sensitivity of the communication unit 100.

Although, as described above, the antenna switch 109 serves the purpose of isolating the transmit and receive portions of the communication unit 100, it does so inefficiently because it introduces additional loss in the transmit path. The additional loss of the antenna switch 109 requires the amplifying device 125 to produce a higher output power than if the antenna switch 109 was not present. In order to produce the higher output power, the amplifying device 105 must (assuming little or no change in amplifier efficiency) consume additional DC power, which substantially reduces talk time. For example, for a transmit amplifier operating at an efficiency of 40% that provides 27 decibels above a milliwatt (dBm) to the antenna 109 during transmission, the transmit amplifier consumes approximately 1.25 watts of DC power if no antenna switch is present. With the antenna switch 109 present and assuming an insertion loss of 0.5 dB for the antenna switch 109, the amount of DC power consumed by the transmit amplifier increases to 1.4 watts. This increase in consumed DC power reduces the talk time by approximately 12% as compared to when no antenna switch is present.

Therefore, a need exists for a method and apparatus for increasing an output impedance of the communication unit's transmit amplifier during receive mode to eliminate the need for an antenna switch, thereby allowing the transmit amplifier to consume less DC power, while mitigating the transmit amplifier's affect on received signals.

DESCRIPTION OF A PREFERRED EMBODIMENT

Generally, the present invention encompasses a method and apparatus for increasing an output impedance of a communication unit's transmit amplifier during a receive mode of the communication unit. A communication unit that includes a transmit amplifier, an antenna, and a signal receiver is operable in at least a transmit mode and a receive mode. During the transmit mode, the transmit amplifier, which includes at least one amplifying device, amplifies an input signal and provides the amplified signal to the antenna for radio transmission. During the transmit mode, the antenna receives radio signals and provides the received signals to the signal receiver. To mitigate the transmit amplifier's effect on the received signals during the receive mode without introducing additional loss in the transmit path between the transmit amplifier and the antenna during the transmit mode, the communication unit, during the receive mode, couples the transmit amplifier directly (e.g., via a transmission line) to the antenna and applies a bias to the amplifying device to increase the output impedance of the transmit amplifier, such that the transmit amplifier does not significantly load the received signals. By increasing the output impedance of the transmit amplifier during the receive mode in this manner, the present invention provides sufficient isolation between the transmit and receive portions of a two-way communication unit without requiring an antenna switch, thereby reducing the radio frequency (RF) output power and DC input power requirements of the transmit amplifier.

Figure 1:
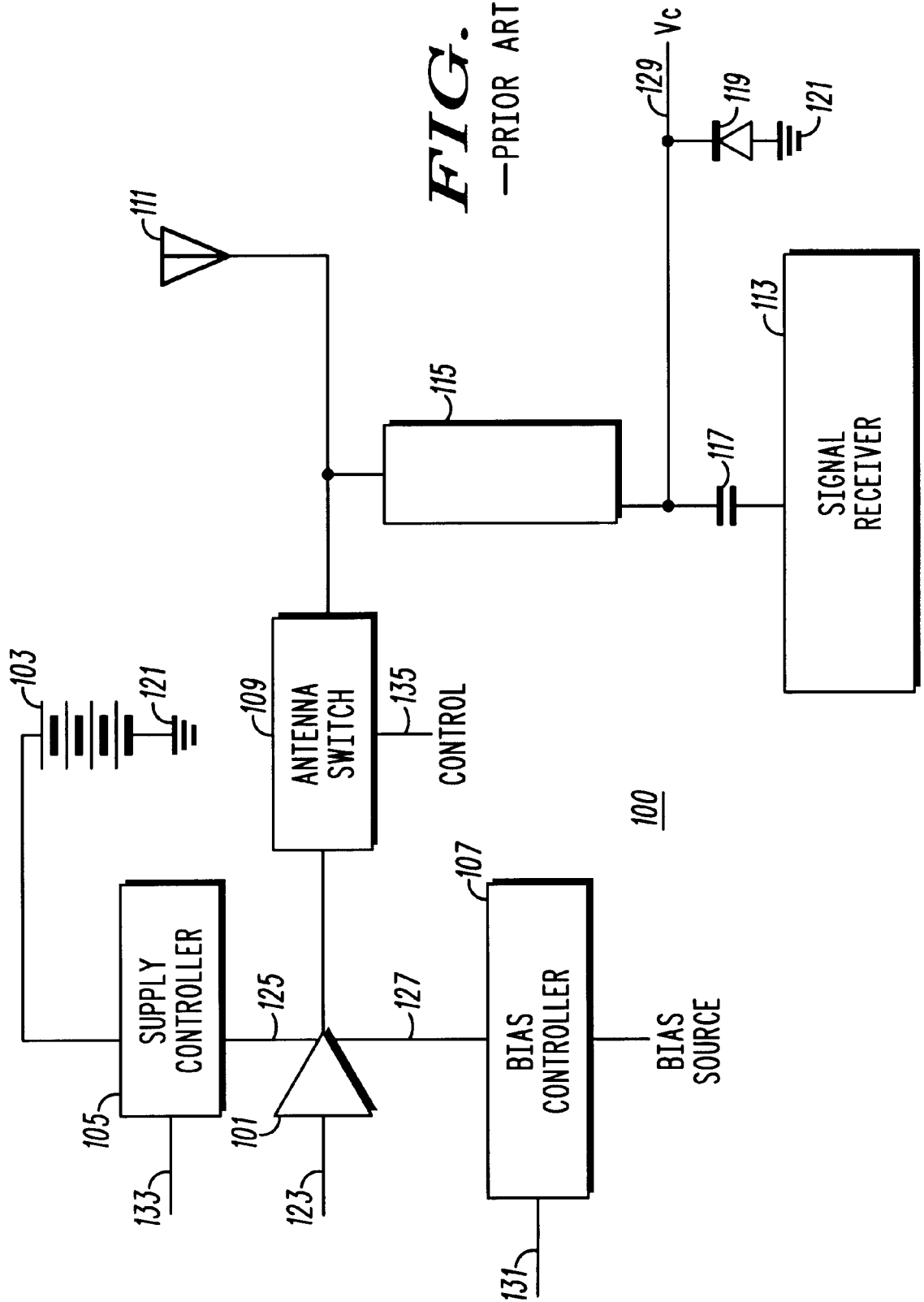
FIG. 1 illustrates a block diagram depiction of the transmit amplifier and receiver portions of a typical wireless two-way communication unit.
Figure 2:
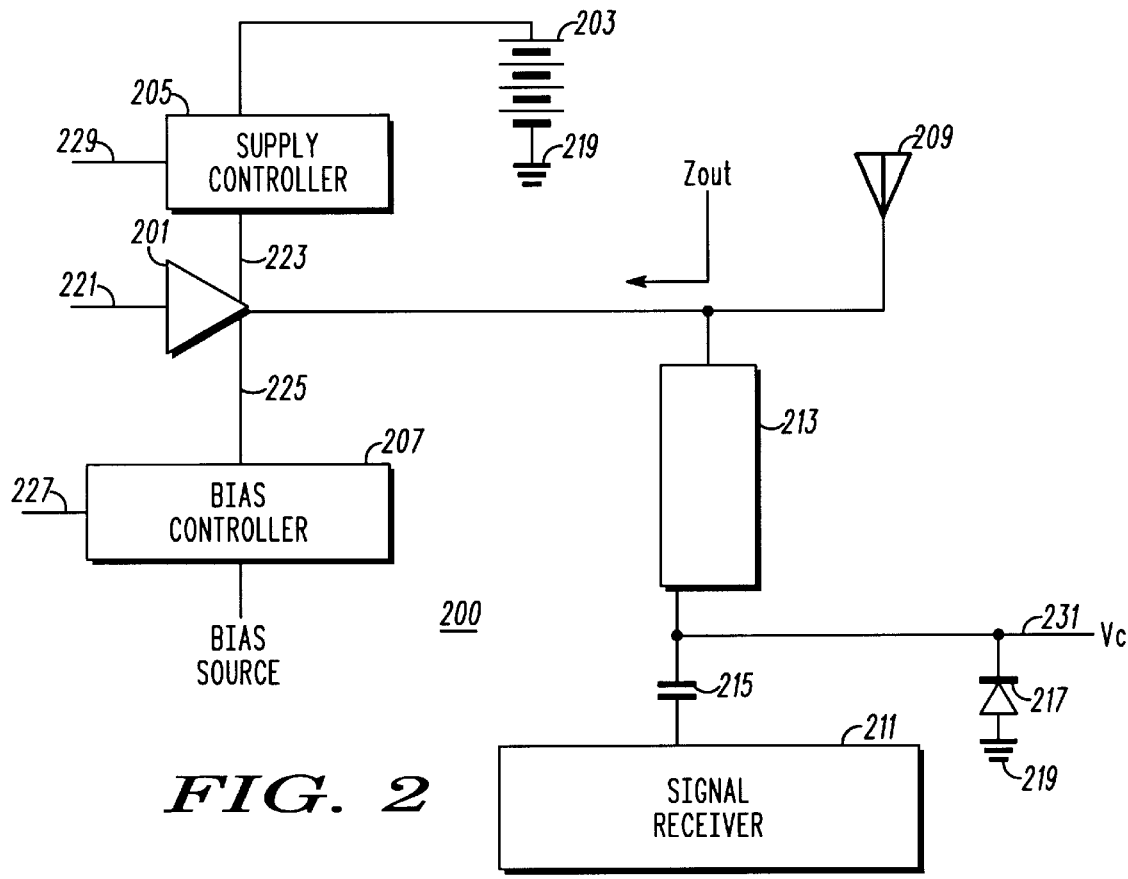
FIG. 2 illustrates a block diagram depiction of the transmit amplifier and receiver portions of a wireless two-way communication unit in accordance with a preferred embodiment of the present invention.
Figure 3:
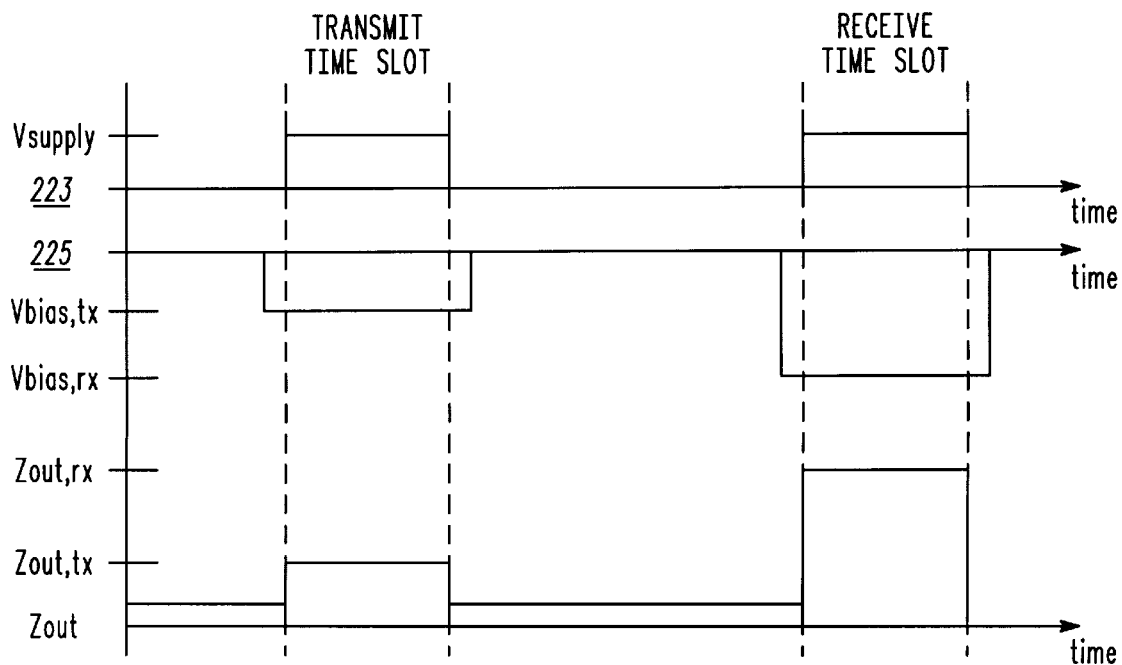
FIG. 3 illustrates a timing diagram depicting supply voltage, amplifier bias voltage, and amplifier output impedance during transmit and receive time slots for the communication unit of FIG. 2.
Figure 4:
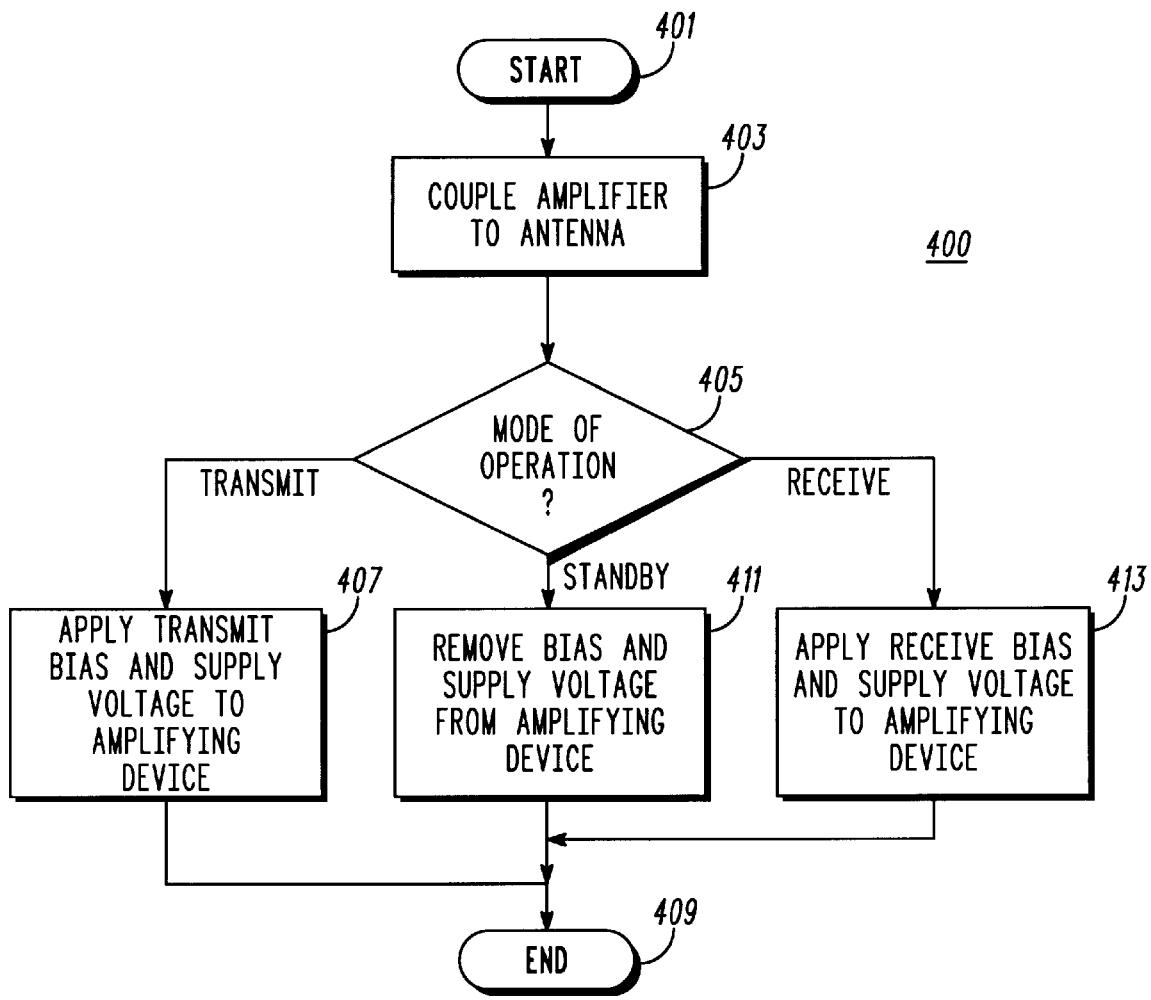
FIG. 4 illustrates a logic flow diagram of steps executed by a communication unit to increase an output impedance of a transmit amplifier during a receive mode of the communication unit in accordance with the preferred embodiment of the present invention.

The present invention can be more fully understood with reference to FIGS. 2–4. FIG. 2 illustrates a block diagram depiction of the transmit amplifier and receiver portions of a wireless two-way communication unit 200 in accordance with a preferred embodiment of the present invention. The transmit amplifier portion of the communication unit 200 includes at least one amplifying device 201, a direct current (DC) power supply 203 (e.g., a battery), a supply voltage controller 205, and a bias controller 207. The receiver portion of the communication unit 200 includes a transmission line 213 having an electrical length of one-quarter wavelength of a transmit frequency of the communication unit 200, a PIN diode 217 coupled between the transmission line 213 and a signal common 219, a DC blocking capacitor 215, and a signal receiver 211. The receiver portion and the transmit amplifier portion are continuously coupled to an antenna 209 preferably via transmission lines (not shown). In the preferred embodiment, the amplifying device 201 comprises a depletion mode field effect transistor, such as a gallium arsenide field effect transistor (GaAs FET), and its associated input and output matching circuitry (not shown). In an alternative embodiment, the amplifying device 201 might comprise an enhancement mode FET, a bipolar junction transistor (BJT), or a heterojunction bipolar transistor (HBT), and its associated input and output matching circuitry.

The supply voltage controller 205 preferably comprises a FET switch operating under the control of a supply control signal 229 generated by a microcontroller or microprocessor (not shown). The bias controller 207 preferably comprises a DC amplifier and/or level shifter operating under the control of a bias control signal 227 generated by a microcontroller or microprocessor (not shown). The signal receiver 211, which includes filters, mixers, and demodulators, is well known in the art; thus no further discussion will be presented except to facilitate a better understanding of the present invention.

Operation of the communication unit 200 occurs substantially as follows in accordance with the preferred embodiment of the present invention. For the purposes of this discussion, it is assumed that the amplifying device 201 is a depletion mode GaAs FET. In the preferred embodiment, the communication unit operates pursuant to a time division duplex communication protocol. That is, the communication unit 200 is allocated a transmit frequency and a transmit time slot for transmitting information and a receive frequency and a receive time slot for receiving information. In the preferred embodiment, the receive frequency is different than the transmit frequency and the receive time slot is separated from the transmit time slot by two or more time slots. Such a time division duplex communication protocol is utilized in the "iDEN" communication system that is commercially available from Motorola, Inc. of Schaumburg, Ill.

When the communication unit 200 is ready to transmit a signal, the communication unit 200 enters a transmit mode. In the transmit mode, the supply control signal 229 is applied to the supply controller 205 to permit the supply controller 205 to provide the DC supply voltage 223 from the power supply 203 to a drain terminal of the GaAs FET amplifying device 201. In addition, the bias control signal 227 is applied to the bias controller 207 to allow the bias controller 207 to provide a negative gate bias voltage 225 from a bias source (e.g., a negative voltage inverter) to a gate terminal of the GaAs FET amplifying device 201. The magnitudes of the supply voltage 223 and the negative gate bias voltage 225 are selected to provide a desired magnitude of the amplified signal 233. For example, for a Motorola MRFIC08K07 GaAs FET amplifying device 201 biased for mobile applications to produce two watts of output power at a frequency of 850 MegaHertz (MHz), the supply voltage 223 preferably is 3.5 volts and the negative gate bias voltage preferably is −2.2 volts.

Finally, a receive enable/disable control signal ($V_c$) 231 is applied to the PIN diode 217 causing the PIN diode 217 to conduct current and effectively short-circuit the receiver end of the one-quarter wavelength transmission line 213 through the PIN diode 217. By short-circuiting the transmission line 213, the transmission line 213 effectively presents an open circuit impedance to the output of the transmit amplifier in accordance with known transmission line theory, thereby allowing substantially all of the amplified signal 233 to be provided to the antenna 209. Once all the control signals 227, 229, 231 have been applied, an input signal 221 is presented to, and amplified by, the GaAs FET amplifying device 201. The amplified signal 233 is then provided to the antenna 209 for subsequent radio propagation.

When the communication unit 200 is ready to receive a signal, the communication unit 200 enters a receive mode. In the receive mode, the amplifying device's input signal 221 is removed and, as in the transmit mode, the supply control signal 229 is applied to the supply controller 205 to permit the supply controller 205 to provide the DC supply voltage 223 from the power supply 203 to the drain terminal of the GaAs FET amplifying device 201. In addition, as also in the transmit mode, the bias control signal 227 is applied to the bias controller 207 to allow the bias controller 207 to provide a negative gate bias voltage 225 from the bias source to the gate terminal of the GaAs FET amplifying device 201. The magnitude of the negative gate bias voltage 225 applied in the receive mode is greater than or equal to the magnitude of the negative gate bias voltage 225 applied in the transmit mode. In the preferred embodiment, the magnitude of the negative gate bias voltage 225 in the receive mode is greater than or equal to the magnitude of the pinchoff voltage of the particular GaAs FET amplifying device 201. However, a negative gate bias voltage 225 in the receive mode need not equal or exceed the magnitude of the pinchoff voltage for such voltage 225 to begin having an increasing effect on the transmit amplifier's output impedance ($Z_{out}$).

Since the preferred amplifying device 201 is a depletion mode device, the transmit amplifier's output impedance increases as the magnitude of the negative gate bias voltage 225 increases. Thus, depending on the particular requirements of the communication unit 200 in receive mode, a magnitude of the negative gate bias voltage 225 of less than the magnitude of the pinchoff voltage may load the received signal a small enough amount so as to not affect the receive operation of the communication unit 200. In addition, depending on the particular requirements of the communication unit 200 in receive mode, the supply voltage 223 may not need to be applied to the amplifying device 201 in order to obtain the desired transmit amplifier output impedance in receive mode. In empirical testing, application of the supply voltage 223 to the GaAs FET amplifying device 201 increased the transmit amplifier output impedance by 400 ohms as compared to applying only a negative gate bias voltage 225 having a magnitude equal to a magnitude of the GaAs FET amplifying device's pinchoff voltage. Timing diagrams depicting supply voltage 223, negative gate bias voltage 225, and amplifier output impedance ($Z_{out}$) in transmit mode and receive mode are illustrated in FIG. 3 and described in more detail below.

In addition to applying the supply voltage 223 and a negative bias voltage 225 to the GaAs FET amplifying device 201 in the receive mode, the communication unit 200 removes the receive enable/disable control signal ($V_c$) 231, thereby reducing the impedance presented to the antenna 209 by the one-quarter wavelength transmission line 213 and allowing signals received by the antenna 209 to be provided to the signal receiver 211 via the DC blocking capacitor 215.

In the preferred embodiment, the communication unit 200 is also operable in a standby mode. In the standby mode, the communication unit 200 is neither transmitting nor receiving. Rather, the communication unit 200 is awaiting receipt of signals from a base station or other communication device, or the instruction to transmit from the unit's user. Methods for a communication unit to detect when it is in standby mode are well-known; thus, no further discussion of such detection methods will be presented. When the communication unit detects that it is in standby mode, it preferably removes the bias voltage 225 and the supply voltage 223 by removing the bias control signal 227 and the supply control signal 229 or, depending on the design of the bias controller 207 and the supply controller 205, applying an appropriate bias control signal 227 to the bias controller 207 and an appropriate supply control signal 229 to the supply controller 205 to remove the bias voltage 225 and the supply voltage 223, respectively. By removing the bias voltage 225 and the supply voltage 223 in standby mode, the communication unit 200 reduces the current drawn by the transmit amplifier during standby, thereby extending battery life.

Therefore, as described above, the present invention provides a method and apparatus for increasing the output impedance of a communication unit's transmit amplifier during receive mode by applying at least a bias voltage (preferably bias and supply voltages) to the transmit amplifier's amplifying device in both transmit and receive modes. The application of appropriate bias and supply voltages to the transmit amplifier's amplifying device in receive mode raises the output impedance of the transmit amplifier to a high enough level so as to permit elimination of antenna switches in half-duplex or time division duplex communication units. By eliminating the need for an antenna switch and the inherent insertion loss associated therewith, the present invention permits the amplifying device to operate at a lower RF output power level than does a prior art communication unit. By allowing the amplifying device to operate at a lower output power, the present invention requires less average DC current and permits a longer talk time than does a prior art communication unit that utilizes the antenna switch approach.

Although operation of the communication unit 200 was described above with respect to utilization of a depletion mode GaAs FET amplifying device 201, those of ordinary skill in the art will appreciate that the present invention may also be used to increase the output impedances of transmit amplifiers utilizing other types of amplifying devices, such as enhancement mode FET amplifying devices or BJT amplifying devices.

FIG. 3 illustrates a timing diagram 300 depicting supply voltage 223, amplifier bias voltage 225, and amplifier output impedance ($Z_{out}$) during transmit and receive time slots for the preferred communication unit of FIG. 2. In time division multiple access (TDMA) communication systems (of which a time division duplex system is one such TDMA system), a communication unit is allocated a transmit time slot on a transmit carrier frequency within which to transmit voice or data and a receive time slot on a receive carrier frequency from which to receive voice or data. Allocation of transmit and receive time slots for time division duplex communications is well known; thus no further discussion of such allocation procedures will be provided.

As shown, the supply voltage 223 and the bias voltage 225 are applied to the amplifying device 201 during both the receive and transmit time slots. The magnitude of the bias voltage 225 applied during the transmit time slot is denoted $V_{bias,tx}$; whereas, the magnitude of the bias voltage 225 applied during the receive time slot is denoted $V_{bias,rx}$. In the preferred embodiment, as shown, the magnitude of the bias voltage 225 applied during the receive mode exceeds the magnitude of the bias voltage 225 applied during the transmit mode. In particular, the magnitude of the bias voltage 225 applied during the receive mode preferably equals a pinchoff voltage of the transmit amplifier's amplifying device. In addition, the bias voltage 225 is applied for a time period (e.g., two milliseconds) just prior to commencement of the transmit and receive slots and for a time period (e.g., two milliseconds) just after completion of the transmit and receive slots; whereas, the supply voltage 223 is applied only during the transmit and receive time slots. By applying the bias voltage 225 just prior to and just after the transmit and receive slots, the bias controller 207 has sufficient time to provide a stable bias voltage 225 to the amplifying device 201.

The output impedance of the transmit amplifier during the transmit and receive time slots is denoted $Z_{out,tx}$ and $Z_{out,rx}$, respectively. The output impedance of the transmit amplifier during the transmit time slot is selected to be the impedance that produces a desired performance (e.g., output power, efficiency, and/or linearity) of the transmit amplifier while the communication unit is in transmit mode. The value of the output impedance of the transmit amplifier during the transmit time slot is determined by the supply voltage 223, the bias voltage 225 applied during the transmit time slot, and the amplifying device's output matching network. However, for a given output matching network, the transmit amplifier's output impedance can be varied by selective application of bias and supply voltages. Thus, during the transmit time slot, the bias and supply voltages are applied to establish a transmit output impedance; whereas, during the receive time slot, the bias and supply voltages are applied to establish a receive output impedance, which, in the preferred embodiment, has a much greater magnitude than the magnitude of the transmit output impedance. By appropriate selection and application of the bias and supply voltages, the receive mode output impedance of the transmit amplifier can be set to have minimal effect on the receive operation of the communication unit, thereby eliminating the need for an antenna switch and the loss associated therewith.

FIG. 4 illustrates a logic flow diagram 400 of steps executed by a communication unit to increase an output impedance of a transmit amplifier during a receive mode of the communication unit in accordance with the preferred embodiment of the present invention. The logic flow begins (401) when an output of the transmit amplifier is coupled (403) (e.g., via a transmission line or cable) to an antenna of the communication unit. In the preferred embodiment, unlike in the prior art, the transmit amplifier's output remains coupled to the antenna in all modes of operation. Thus, in contrast to prior art approaches of coupling the transmit amplifier's output to the antenna during a transmit mode only, the present invention maintains the coupling between the transmit amplifier's output and the antenna during both the transmit and receive modes of operation.

Once the antenna is coupled to the transmit amplifier's output, the communication unit begins operating in any one of three modes. Consequently, the communication unit determines (405) which mode of operation it is currently in. The determination of a communication unit's operating mode is well-known; thus no further discussion will be presented. Upon determining that the communication unit is in transmit mode, the communication unit applies (407) transmit bias and supply voltages to the transmit amplifier's amplifying device to enable the transmit amplifier to amplify an input signal to a desired output level. The amplified signal is provided to the antenna for transmission and the logic flow ends (409).

Upon determining that the communication unit is in standby mode, the communication unit removes (411) the bias and supply voltages from the transmit amplifier's amplifying device to conserve battery power, and the logic flow ends (409). Finally, upon determining that the communication unit is in receive mode, the communication unit applies (413) receive bias and supply voltages to the transmit amplifier's amplifying device to increase the output impedance of the transmit amplifier to a level that is high enough (e.g., 100 times an input impedance of the communication unit's signal receiver) to prevent the transmit amplifier from substantially loading the received signals. In the preferred embodiment, the communication unit applies identical supply voltages to the transmit amplifier's amplifying device during receive and transmit modes, but substantially different bias voltages (e.g., a pinchoff voltage in receive mode and a voltage to establish Class AB linear operation of the transmit amplifier's amplifying device in transmit mode). However, in alternate embodiment, the communication unit might apply different supply voltages, as well as different biases, during receive and transmit modes. Furthermore, in yet another embodiment, the communication unit might apply a bias only, and no supply voltage during receive mode if application of the bias increases the output impedance of the transmit amplifier to a high enough level to prevent the transmit amplifier from substantially loading the received signals.

The present invention encompasses a method and apparatus for increasing an output impedance of a communication unit's transmit amplifier during a receive mode of the communication unit. With such an invention, the antenna switch of prior art half-duplex and time division duplex communication units can be eliminated, thereby allowing the communication unit's transmit amplifier to operate at lower output power levels (and accordingly lower DC input power levels) than corresponding prior art amplifiers. By consuming less DC power in transmit mode, a communication unit incorporating the present invention will provide, on average, more talk time than does an existing communication unit that incorporates an antenna switch. Moreover, the present invention provides a talk time improvement without jeopardizing the isolation between the transmit amplifier and the receiver. By applying an appropriate bias and, if necessary, a supply voltage to the transmit amplifier during receive mode, the present invention increases the output impedance of the transmit amplifier to a level sufficient to prevent the transmit amplifier from significantly affecting the received signals.

While the present invention has been particularly shown and described with reference to particular embodiments thereof, it will be understood by those skilled in the art that various changes in form and details may be made therein without departing from the spirit and scope of the present invention. For example, one of ordinary skill in the art will recognize that the one-quarter wavelength transmission line 213 may be replaced with appropriately-arranged lumped elements (i.e., capacitors and inductors) to approximate the functionality of the one-quarter wavelength transmission line 213.

We claim:

1. In a communication unit that includes a transmit amplifier and an antenna, the communication unit being operable in at least a transmit mode, a receive mode, and a standby mode in which the communication unit is neither transmitting nor receiving, a method for increasing an output impedance of the transmit amplifier during the receive mode, the method comprising the steps of:

in the receive mode:
coupling the transmit amplifier to the antenna; and
applying a first bias to an amplifying device of the transmit amplifier to increase the output impedance of the transmit amplifier, wherein the amplifying device is capable of amplifying a signal input into the amplifying device when the communication device is operating in the transmit mode;

in the standby mode:
coupling the transmit amplifier to the antenna; and
removing the first bias from the amplifying device.

2. The method of claim 1, further comprising the steps of:
in the transmit mode:
coupling the transmit amplifier to the antenna;
applying a second bias to the amplifying device to enable the transmit amplifier to amplify an input signal; and
applying a supply voltage to the amplifying device.

3. The method of claim 2, wherein the amplifying device is a depletion mode device, wherein the first bias and the second bias are voltages, and wherein a magnitude of the first bias is greater than or equal to a magnitude of the second bias.

4. The method of claim 3, wherein the amplifying device is a gallium arsenide device and wherein a magnitude of the first bias is greater than or equal to a magnitude of a pinchoff voltage of the amplifying device.

5. The method of claim 1, wherein the communication unit operates in a time division duplex communication system and wherein the step of applying comprises the step of applying the first bias during a receive time slot allocated to the communication unit.

6. The method of claim 1, further comprising the step of applying a supply voltage to the amplifying device during the receive mode to further increase the output impedance of the transmit amplifier.

7. A communication unit that is operable in at least a transmit mode, a receive mode, and a standby mode in which the communication unit is neither transmitting nor receiving, the communication unit comprising:
an antenna; and
a transmit amplifier, coupled to the antenna during the transmit mode, the receive mode, and the standby mode, that includes an amplifying device and a bias controller coupled to the amplifying device, wherein the bias controller applies a first bias to the amplifying device during the receive mode to increase an output impedance of the transmit amplifier during the receive mode, wherein the bias controller removes the first bias from the amplifying device during the standby mode, and wherein the amplifying device is capable of amplifying a signal input into the amplifying device when the communication device is operating in the transmit mode.

8. The communication unit of claim 7, further comprising a power supply, coupled to the amplifying device, that applies a supply voltage to the amplifying device during at least the transmit mode.

9. The communication unit of claim 7, wherein the bias controller further applies a second bias to the amplifying device during the transmit mode to enable the transmit amplifier to amplify an input signal during the transmit mode.

10. The communication unit of claim 9, wherein the amplifying device is a depletion mode device, wherein the first bias and the second bias are voltages, and wherein a magnitude of the first bias is greater than or equal to a magnitude of the second bias.

11. The communication unit of claim 10, wherein the amplifying device is a gallium arsenide device and wherein a magnitude of the first bias is greater than or equal to a magnitude of a pinchoff voltage of the amplifying device.

12. The communication unit of claim 7, further comprising a signal receiver that is operably coupled to the antenna during the receive mode.

13. The communication unit of claim 7, further comprising:
a transmission line, coupled at a first end to the antenna and the transmit amplifier, having an electrical length of one-quarter wavelength at a transmit frequency of the communication unit;
a diode, coupled between a second end of the transmission line and a signal common, the diode conducting current during the transmit mode; and
a signal receiver coupled to the second end of the transmission line.

* * * * *